United States Patent
Elden

(10) Patent No.: US 12,275,446 B2
(45) Date of Patent: Apr. 15, 2025

(54) HIGH LOAD CAPACITY COLLAPSIBLE CARTS

(71) Applicant: Richard Elden, Manhattan Beach, CA (US)

(72) Inventor: Richard Elden, Manhattan Beach, CA (US)

(73) Assignee: dbest products, Inc., Carson, CA (US)

( * ) Notice: Subject to any disclaimer, the term of this patent is extended or adjusted under 35 U.S.C. 154(b) by 13 days.

(21) Appl. No.: 18/460,131

(22) Filed: Sep. 1, 2023

(65) Prior Publication Data

US 2023/0406385 A1     Dec. 21, 2023

Related U.S. Application Data

(63) Continuation of application No. 17/143,116, filed on Jan. 6, 2021, now Pat. No. 11,338,835, and a continuation of application No. 18/161,677, filed on Jan. 30, 2023, and a continuation-in-part of application No. 17/712,032, filed on Apr. 1, 2022, now Pat. No. 11,565,735.

(Continued)

(51) Int. Cl.
B62B 3/02     (2006.01)

(52) U.S. Cl.
CPC .................... B62B 3/025 (2013.01)

(58) Field of Classification Search
CPC ......... B62B 3/025; B62B 3/027; B62B 3/022; B62B 3/02; B62B 5/02; B62B 5/026; B62B 5/028
See application file for complete search history.

(56) References Cited

U.S. PATENT DOCUMENTS

| 1,554,034 A | 9/1925 | Richie |
| 2,132,069 A | 10/1938 | Hall |

(Continued)

FOREIGN PATENT DOCUMENTS

| CN | 206813544 U | 12/2017 |
| CN | 107668883 A | 2/2018 |

(Continued)

OTHER PUBLICATIONS

Amazon.com, "Foldable Utility Cart Portable Rolling Crate Handcart Shopping Trolley Collapsible 4 Rotate Wheels with Durable Heavy Duty Plastic Telescoping Handle for Travel Shopping Moving Storage Office Use", Available online at: "https://www.amazon.com/Portable-Handcart-Telescoping-Collapsible-Shopping/dp/B08HT17X39?th=1", Retrieved on Sep. 6, 2023, 8 pages.

(Continued)

*Primary Examiner* — John D Walters
(74) *Attorney, Agent, or Firm* — Orbit IP, LLP

(57) ABSTRACT

Compressible carts and methods for using the same are provided. The compressible carts include a rigid frame having a front wall, a rear wall, a right sidewall, a left sidewall, and a bottom wall. The right sidewall comprising a first right panel rotatably coupled to a second right panel. The compressible carts may also include a first lock assembly integrated with the first right panel and the second right panel. The first lock assembly having a first condition for locking the first right panel to the second right panel, and a second condition for unlocking the first right panel from the second right panel.

27 Claims, 18 Drawing Sheets

Related U.S. Application Data

(60) Provisional application No. 62/995,375, filed on Jan. 27, 2020, provisional application No. 62/974,956, filed on Jan. 6, 2020.

(56) References Cited

U.S. PATENT DOCUMENTS

| | | |
|---|---|---|
| 2,362,721 A | 11/1944 | Reynolds |
| 2,514,849 A | 7/1950 | Dewing |
| 2,564,939 A | 8/1951 | Weast |
| 2,715,533 A | 8/1955 | Strausburg |
| 2,742,973 A | 4/1956 | Johannesen |
| 2,757,935 A | 8/1956 | Sofia |
| 2,786,692 A | 3/1957 | Timpson |
| 2,957,700 A | 10/1960 | Beaurline |
| 3,041,026 A | 6/1962 | Wilson |
| 3,092,395 A | 6/1963 | Mitty et al. |
| 3,135,527 A | 6/1964 | Knapp |
| 3,276,786 A | 10/1966 | Olander |
| 3,804,432 A | 4/1974 | Lehrman |
| 3,981,410 A | 9/1976 | Schurch |
| 4,202,521 A | 5/1980 | Harding |
| 4,509,461 A | 4/1985 | Peck |
| 4,662,532 A | 5/1987 | Anderson et al. |
| D292,135 S | 9/1987 | Grube et al. |
| 4,765,644 A | 8/1988 | Bell |
| 4,765,646 A | 8/1988 | Cheng |
| 4,852,520 A | 8/1989 | Goetz |
| 4,887,837 A | 12/1989 | Bonewicz, Jr. et al. |
| 4,977,857 A | 12/1990 | Slawinski |
| 5,197,754 A | 3/1993 | Ward |
| 5,244,219 A | 9/1993 | Hadlum |
| 5,289,933 A | 3/1994 | Streich et al. |
| 5,294,158 A | 3/1994 | Cheng |
| D352,145 S | 11/1994 | Perez |
| 5,603,573 A | 2/1997 | Mercier et al. |
| 5,653,194 A | 8/1997 | Guy |
| 5,660,476 A | 8/1997 | DeCoster |
| 5,678,842 A | 10/1997 | Hook et al. |
| 5,765,665 A | 6/1998 | Cheng et al. |
| 5,884,982 A | 3/1999 | Yemini |
| 5,988,671 A | 11/1999 | Abelbeck et al. |
| 6,021,740 A | 2/2000 | Martz |
| 6,076,485 A | 6/2000 | Peeples et al. |
| 6,126,183 A | 10/2000 | Lensing |
| 6,431,580 B1 | 8/2002 | Kady |
| 6,561,524 B1 | 5/2003 | Medina |
| 6,598,898 B2 | 7/2003 | Chu |
| D477,916 S | 8/2003 | Nykoluk |
| 6,601,859 B2 | 8/2003 | Durham |
| 6,626,634 B2 | 9/2003 | Hwang et al. |
| 6,651,791 B1 | 11/2003 | Nykoluk et al. |
| 6,688,516 B1 | 2/2004 | Ussen |
| 6,918,474 B2 | 7/2005 | Nykoluk |
| 7,066,476 B2 | 6/2006 | Elden |
| D525,758 S | 7/2006 | Lynch |
| 7,140,635 B2 | 11/2006 | Johnson et al. |
| 7,147,243 B2 | 12/2006 | Kady |
| D545,025 S | 6/2007 | Elden |
| 7,316,407 B1 | 1/2008 | Elden |
| D565,269 S | 3/2008 | Tomasiak et al. |
| 7,458,451 B2 | 12/2008 | Godshaw et al. |
| 7,617,797 B2 | 11/2009 | Lam |
| 7,731,221 B2 | 6/2010 | Bess |
| 7,789,044 B2 | 9/2010 | McGrade |
| 7,914,015 B2 | 3/2011 | Tompkins |
| D642,764 S | 8/2011 | Elden |
| 8,317,219 B2 | 11/2012 | Bruce |
| 8,366,124 B1 | 2/2013 | Caldwell |
| 8,439,374 B1 | 5/2013 | Elden |
| D690,893 S | 10/2013 | O'Brien |
| 8,579,305 B2 | 11/2013 | Hou |
| 8,641,059 B2* | 2/2014 | Khodor .................. B62B 1/12 |
| | | 280/47.28 |
| 8,757,412 B2 | 6/2014 | Sommer et al. |
| 8,915,504 B1 | 12/2014 | Seibert |
| D723,237 S | 2/2015 | Maddux et al. |
| 9,233,700 B1 | 1/2016 | Elden |
| 9,278,775 B2 | 3/2016 | Meers et al. |
| 9,382,035 B2* | 7/2016 | Fritz .................. B65D 21/0213 |
| 9,392,766 B1 | 7/2016 | Elden |
| 10,588,388 B2 | 3/2020 | Kabalin |
| 10,676,235 B1* | 6/2020 | Song .................. B65D 11/1873 |
| D904,716 S | 12/2020 | Shen |
| D930,314 S | 9/2021 | Huang |
| D932,186 S | 10/2021 | Brunner et al. |
| D942,107 S | 1/2022 | Ren |
| 11,338,835 B2 | 5/2022 | Elden |
| D975,953 S | 1/2023 | Cohen et al. |
| D1,000,833 S | 10/2023 | Song |
| 2002/0050429 A1 | 5/2002 | Nykoluk et al. |
| 2002/0089134 A1 | 7/2002 | Salzberger et al. |
| 2002/0139628 A1 | 10/2002 | Chang |
| 2002/0144874 A1 | 10/2002 | Nykoluk et al. |
| 2002/0171228 A1 | 11/2002 | Kady |
| 2003/0011173 A1* | 1/2003 | Shall .................. A01K 97/22 |
| | | 280/639 |
| 2004/0075248 A1 | 4/2004 | Elden |
| 2004/0211635 A1 | 10/2004 | Lu |
| 2005/0275195 A1 | 12/2005 | Matula et al. |
| 2006/0278173 A1 | 12/2006 | Kamijo |
| 2007/0215425 A1 | 9/2007 | Slater |
| 2009/0145913 A1* | 6/2009 | Panosian .................. B62B 1/12 |
| | | 220/666 |
| 2009/0205578 A1 | 8/2009 | Alves |
| 2009/0212536 A1 | 8/2009 | Tadeo |
| 2010/0026080 A1* | 2/2010 | Colchiesqui ............ B62B 5/026 |
| | | 301/5.23 |
| 2010/0175633 A1 | 7/2010 | Krauss et al. |
| 2011/0056441 A1 | 3/2011 | Chang |
| 2011/0197823 A1 | 8/2011 | Pietra |
| 2012/0055122 A1 | 3/2012 | Beauchamp |
| 2012/0274052 A1 | 11/2012 | Zhu |
| 2013/0320641 A1 | 12/2013 | Zhang |
| 2015/0076143 A1 | 3/2015 | Ryan |
| 2015/0360710 A1 | 12/2015 | Thompson |
| 2017/0001654 A1* | 1/2017 | Obrien ...................... B62B 1/14 |
| 2017/0120679 A1 | 5/2017 | Naiva |
| 2017/0297601 A1 | 10/2017 | Carbonaro |
| 2018/0014502 A1 | 1/2018 | O'Shaughnessy et al. |
| 2019/0216193 A1 | 7/2019 | Kabalin |
| 2019/0270545 A1 | 9/2019 | Apps et al. |
| 2019/0322302 A1* | 10/2019 | Greenup .................. B62B 1/002 |
| 2020/0269898 A1 | 8/2020 | Frankel et al. |
| 2021/0206414 A1 | 7/2021 | Elden |

FOREIGN PATENT DOCUMENTS

| | | |
|---|---|---|
| CN | 207120985 U | 3/2018 |
| CN | 207191693 | 4/2018 |
| CN | 207506081 U | 6/2018 |
| CN | 108328065 | 7/2018 |
| CN | 208070260 | 11/2018 |
| CN | 304926177 S | 12/2018 |
| CN | 305015819 | 1/2019 |
| CN | 209177176 | 7/2019 |
| CN | 210747711 | 6/2020 |
| CN | 112918890 A | 6/2021 |
| CN | 214777508 | 11/2021 |
| CN | 214987334 U | 12/2021 |
| DE | 9203114 U1 | 5/1992 |
| DE | 202020102798 | 5/2020 |
| EP | 3318465 | 5/2018 |
| FI | 128389 B | 4/2020 |
| GB | 2243198 | 10/1991 |
| GB | 2349186 | 10/2000 |

OTHER PUBLICATIONS

Amazon.com, Foldable Utility Cart Folding Portable Rolling Crate Handcart with Durable Heavy Duty Plastic Telescoping Handle Collapsible 4 Rotate Wheels for Travel Shopping Moving Luggage

(56) References Cited

OTHER PUBLICATIONS

Office Use (Red), Available online at: "https://www.amazon.com/Foldable-Portable-Handcart-Telescoping-Collapsible/dp/B07YFG4BW6/ref=sr_1_1?dchild=1&keywords=B07YFG4BW6&qid=1627442148&sr=8-1&th=1" Retrieved on Sep. 6, 2023, 9 pages.

Amazon.com, "Olympia Tools 85-015 Grand Folding Storage Rolling Cart with Telescopic Handle for Easy Transportation, Weight Capacity up to 150 Pounds", Available online at : "https://www.amazon.ca/Pack-N-Roll-85-015-917-85-015-Portable-Capacity/dp/B076D9XG7T?th=1", Retrieved on Sep. 6, 2023, 7 pages.

Amazon.com, "Olympia Tool 85-010 Grand Pack-N-Roll Portable Tool Carrier, Black" Available online at: "https://web.archive.org/web/20150727103951/http://www.amazon.com:80/Olympia-85-010-Pack-N-Roll-Portable-Carrier/dp/B000UZ0P7l ", Retrieved on Sep. 6, 2023, 5 pages.

Bed Bath and Beyond.com, "Folding Crate Cart in Grey", 2022, 9 pages.

Global Industrial, "Olympia Tools Grand Pack-N-Roll® Rolling Folding Crate Cart 85-010—80 Lb. Capacity", 6 Available online at: "https://www.globalindustrial.com/p/pack-n-roll-grand-rolling-folding-crate-cart-85-010", Retrieved on Sep. 6, 2023, 3 pages.

Ebay.com, "Dbest Products Quik Cart Elite Stair Climber wheeled rolling crate", May 31, 2022, 4 pages, https://www.ebay.com/itm/394062298897.

\* cited by examiner

HIGH LOAD CAPACITY COLLAPSIBLE CARTS

RELATED APPLICATIONS

This application is a continuation of U.S. patent application Ser. No. 18/161,677, filed on Jan. 30, 2023, which is a continuation-in-part of U.S. patent application Ser. No. 17/712,032, filed on Apr. 1, 2022, and issued as U.S. Pat. No. 11,565,735, which is a continuation of U.S. patent application Ser. No. 17/143,116, filed on Jan. 6, 2021, and issued as U.S. Pat. No. 11,338,835, which claims the benefit of the filing date of U.S. Provisional Patent Application, Ser. No. 62/974,956, filed on Jan. 6, 2020, and U.S. Provisional Patent Application Ser. No. 62/995,375, filed on Jan. 27, 2020, the disclosure of each of which is incorporated herein by reference in its entirety.

FIELD OF THE INVENTION

This patent document relates to collapsible carts, and more particularly, to wheeled collapsible carts for high load capacity that is capable of folding up for convenient storage.

DESCRIPTION OF THE RELATED ART

Collapsible carts have been widely used in household and commercial settings. They provide a convenient way to transport objects when needed, but can be folded or collapsed for storage.

The following patents and published applications are representative prior art: 1. U.S. Pat. No. 2,564,939 issued to Louis S. Weast on Aug. 21, 1951 for "Foldable Shopping Cart"; 2. U.S. Pat. No. 2,786,692 issued to Anne Jackson Timpson on Mar. 26, 1957 for "Collapsible Cart"; 3. U.S. Pat. No. 3,092,395 issued to Sol Mitty et al. on Jun. 4, 1963 for "Corrugated Shopping Cart and Parts"; 4. U.S. Pat. No. 3,135,527 issued to Philip B. Knapp on Jun. 2, 1964 for "Wheeled Market Carts"; 5. U.S. Pat. No. Des. 292,135 issued to John W. Grube et al. on Sep. 29, 1987 for "Collapsible Cart"; 6. U.S. Pat. No. 4,765,644 issued to Laurence G. Bell on Aug. 23, 1988 for "Foldable Cart"; 7. U.S. Pat. No. 4,765,646 issued to Karen Cheng on Aug. 23, 1988 for "Collapsible Shopping Cart"; 8. U.S. Pat. No. 5,197,754 issued to Lyla B. Ward on Mar. 30, 1993 for "Collapsible Beach Cart"; 9. U.S. Pat. No. 5,244,219 issued to Sidney R. Hadlum on Sep. 14, 1993 for "Hand Held Carrier"; 10. U.S. Pat. No. 5,988,671 issued to Kevin G. Abelbeck et al. on Nov. 23, 1999 for "Collapsible Cart"; 11. United States Published Patent Application No. 2002/0050429 to Cory O. Nykoluk et al. on May 2, 2002 for "Pivotal Handle For Towable Baggage"; 12. United States Published Patent Application No. 2002/0139628 to Wen-Cheng Chang on Oct. 3, 2002 for "Retractable Handle Assembly"; 13. United States Published Patent Application No. 2002/0144874 to Cory O. Nykoluk et al. on Oct. 10, 2002 for "Pivotal Handle For Towable Baggage"; 14. U.S. Pat. No. 6,598,898 issued to Yong S. Chu on Jul. 29, 2003 for "Folding Cart"; 15. U.S. Pat. No. D477,916 issued to Cory O. Nykoluk on Aug. 5, 2003 for "Towing Member For A Piece of Baggage"; 16. U.S. Pat. No. 6,651,791 issued to Cory O. Nykoluk et al. on Nov. 25, 2003 for "Pivotal Handle For Towable Baggage"; 17. United States Published Patent Application No. 2004/0211635 to Chen-Tien Lu on Oct. 28, 2004 for "Apparatus for Mounting Telescopic Handle on Trunk"; 18. U.S. Pat. No. 6,918,474 issued to Cory O. Nykoluk on Jul. 19, 2005 for "Towable Wheeled-Backpack"; 19. United States Published Patent Application No. 2009/0212536 to Maria I. Tadeo on Aug. 27, 2009 for "Collapsible Rolling Tote Bag"; 20. U.S. Pat. No. 7,731,221 issued to Suzan L. Bess on Jun. 8, 2010 for "Collapsible and Portable Wheeled Dolly Particularly Suitable for Use by Students or Others in the Transport of Items"; 21. U.S. Pat. No. 7,066,476 issued to the named inventor Richard Elden on Jun. 27, 2006 for "Side Attachable Cover/Seat for a Cart Carrying Box"; and 22. U.S. Pat. No. 8,439,374 issued to the named inventor Richard Elden on May 14, 2013 for "Lightweight High Load Capacity Folding Utility Cart with Unique Support Structure and Ergonomic Handle."

Because of the collapsible nature of the prior art cart design, the sidewalls may not be sufficiently sturdy to allow for transporting heavy objects. None of the prior art has effectively addressed this problem. Thus, the need for improvements to collapsible carts still remains.

SUMMARY

Collapsible carts are disclosed herein. The collapsible carts may include a rigid frame forming a compartment, and having a front wall, a rear wall, a right sidewall, a left sidewall, and a bottom wall. The right sidewall and the left sidewall may be configured to fold inwardly in the closed condition. The right sidewall may include a first right panel rotatably coupled to a second right panel. The collapsible carts may also include a first track formed along the first right panel and the second right panel extending from a first position on the first right panel to a second position on the second right panel.

In one embodiment, the collapsible carts may include a first slideable member cooperatively engaged to the first track. The first slideable member may be movable along the first track between an open position to a closed position to selectively lock the first right panel to the second right panel. The first slideable member may be in the open position when disposed along the first track adjacent the first position of the first track while not disposed along the second right panel and may be in the closed position when disposed along the first track adjacent the second position of the first track while being disposed across both the first right panel and second right panel.

In yet another embodiment, the collapsible carts may include a plurality of wheel assemblies, such as a plurality of rotatable swivel wheels mounted at one or more locations underneath the bottom wall, or a plurality of wheels rotatably coupled to a plurality of spokes, where each spoke is coupled to a spindle located underneath the bottom wall or at the intersection between the bottom wall and the rear wall.

In one embodiment, the plurality of rotatable swivel wheels coupled to the bottom wall of the cart include at least one wheel locking assembly having a first condition for locking at least one of the rotatable swivel wheels to prevent rolling movement, and a second condition for unlocking the at least one of the rotatable swivel wheels. The at least one-wheel locking assembly comprising a brake actuator pedal.

In yet another embodiment, the collapsible carts may include a rigid cover panel and a retractable handle. The rigid cover panel may be configured to confirm in shape to a top opening of the compartment, and securely fitting in a first position over the top opening to serve as a cover or seat on top of the cart. The retractable handle adjacent the back wall.

In another embodiment, the left sidewall of the collapsible carts may include a first left panel rotatably coupled to a second left panel. A second track may be formed along the first left panel and the second left panel and extend from a first position on the first left panel to a second position on the second left panel. In an embodiment, the collapsible carts include a second slideable member cooperatively engaged to the second track. The second slideable member may be movable along the second track between an open position to a closed position to selectively lock the first left panel to the second left panel. The second slideable member may be in the open position when disposed along the second track adjacent the first position of the second track while not disposed along the second left panel and may be in the closed position when disposed along the second track adjacent the second position of the second track while being disposed across both the first left panel and second left panel.

In yet another embodiment, the collapsible carts may be configured to transition from a closed condition where it is folded up to an open condition where it is expanded for use. The collapsible carts may include a rigid frame forming a compartment in the open condition. The rigid frame having a front wall, a rear wall, a right sidewall, a left sidewall, and a bottom wall. The right sidewall and the left sidewall may be configured to fold inwardly in the closed condition. The right sidewall may comprise a first right panel rotatably coupled to a second right panel. The first right panel comprising a first locking member and the second right panel comprising a second locking member. In one embodiment, the first locking member may cooperatively engage the second locking member along a first track to removably couple the first right panel to the second right panel. The right sidewall comprising a first right panel rotatably coupled to a second right panel. The collapsible carts may include a first lock assembly integrated with the first right panel and the second right panel. The first lock assembly having a first condition for locking the first right panel to the second right panel, and a second condition for unlocking the first right panel from the second right panel.

In one embodiment, at least one of the front wall, the rear wall, the right sidewall, and the left sidewall includes at least one aperture disposed therethrough.

Each of the foregoing various aspects, together with those set forth in the claims and described in connection with the embodiments summarized above and disclosed herein may be combined to form claims for a device, apparatus, system, methods of manufacture and/or use in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

Unique and inventive collapsible carts are disclosed herein. Although embodiments of collapsible carts are disclosed herein, it is to be expressly understood that the present invention is not restricted solely to such embodiments. Rather, the present disclosure is directed to each of the inventive features described below, both individually as well as collectively, in various embodiments. Further, as will become apparent to those skilled in the art, one or more aspects of the present disclosure may be incorporated in other devices.

Figure 1:
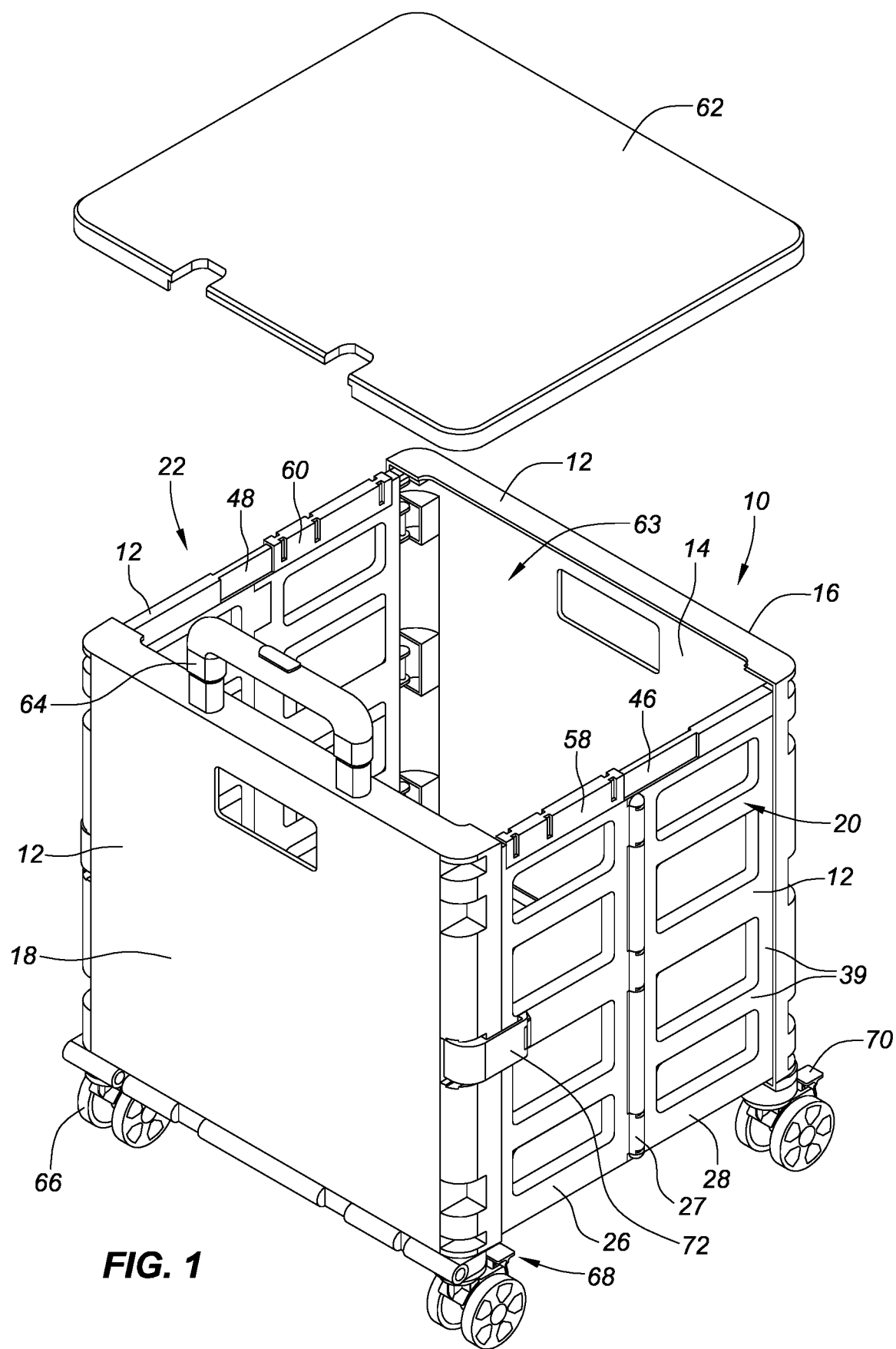
FIG. 1 is a perspective view of a collapsible cart illustrated in an open condition, according to an embodiment.
Figure 2:
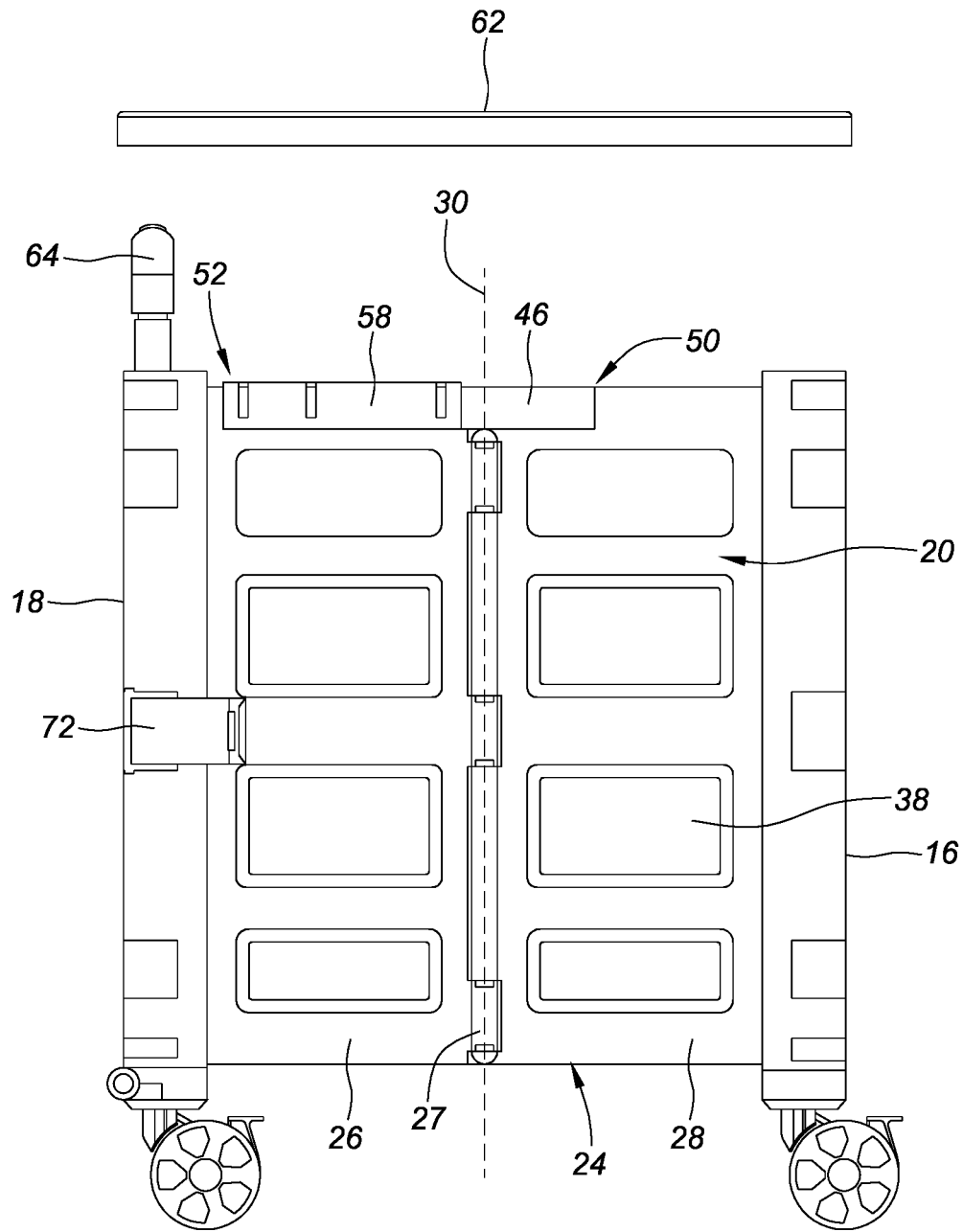
FIG. 2 is right side view of the collapsible cart of FIG. 1, according to an embodiment.
Figure 3:
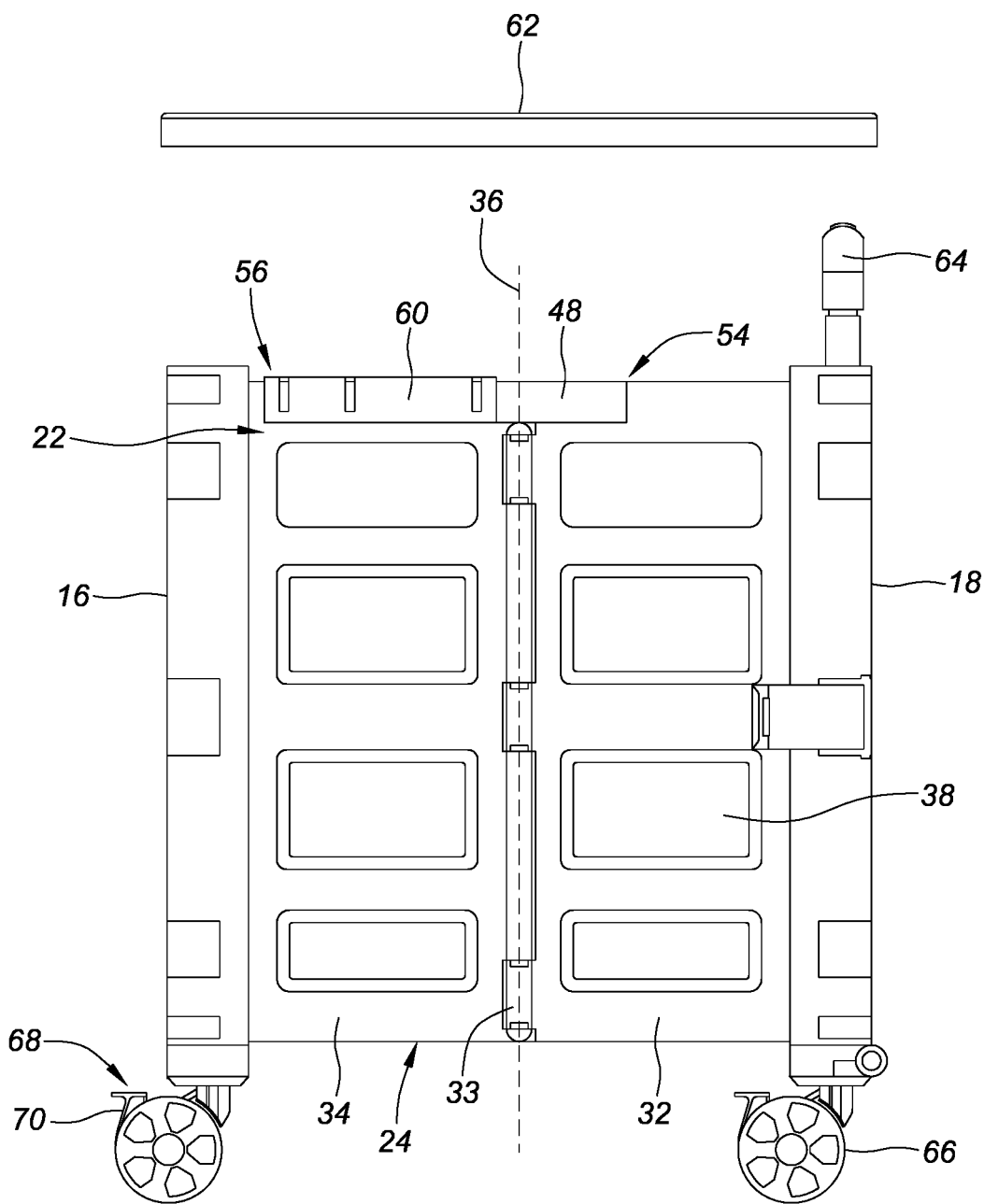
FIG. 3 is left side view of the collapsible cart of FIG. 1, according to an embodiment.
Figure 4:
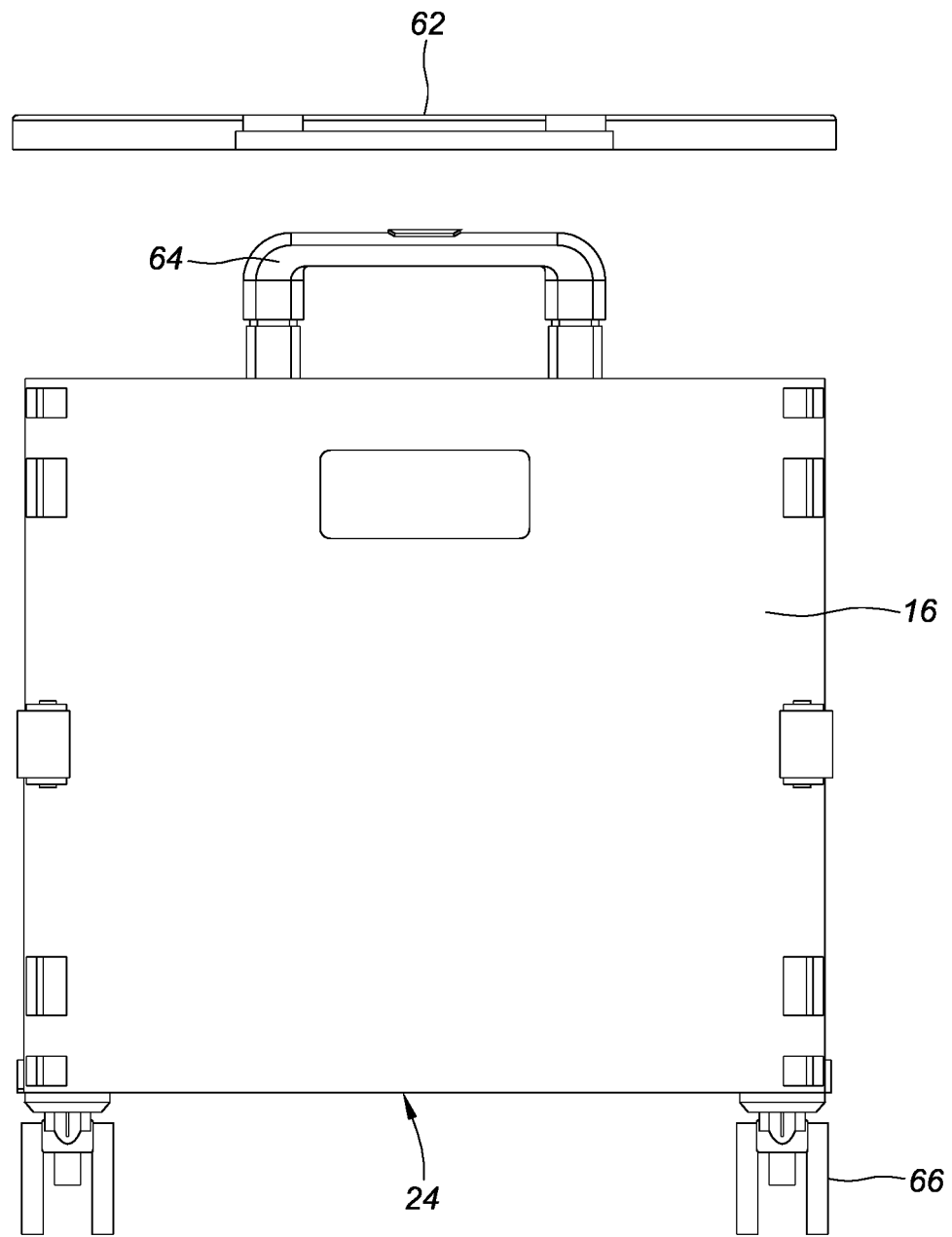
FIG. 4 is front plan view of the collapsible cart of FIG. 1, according to an embodiment.
Figure 5:
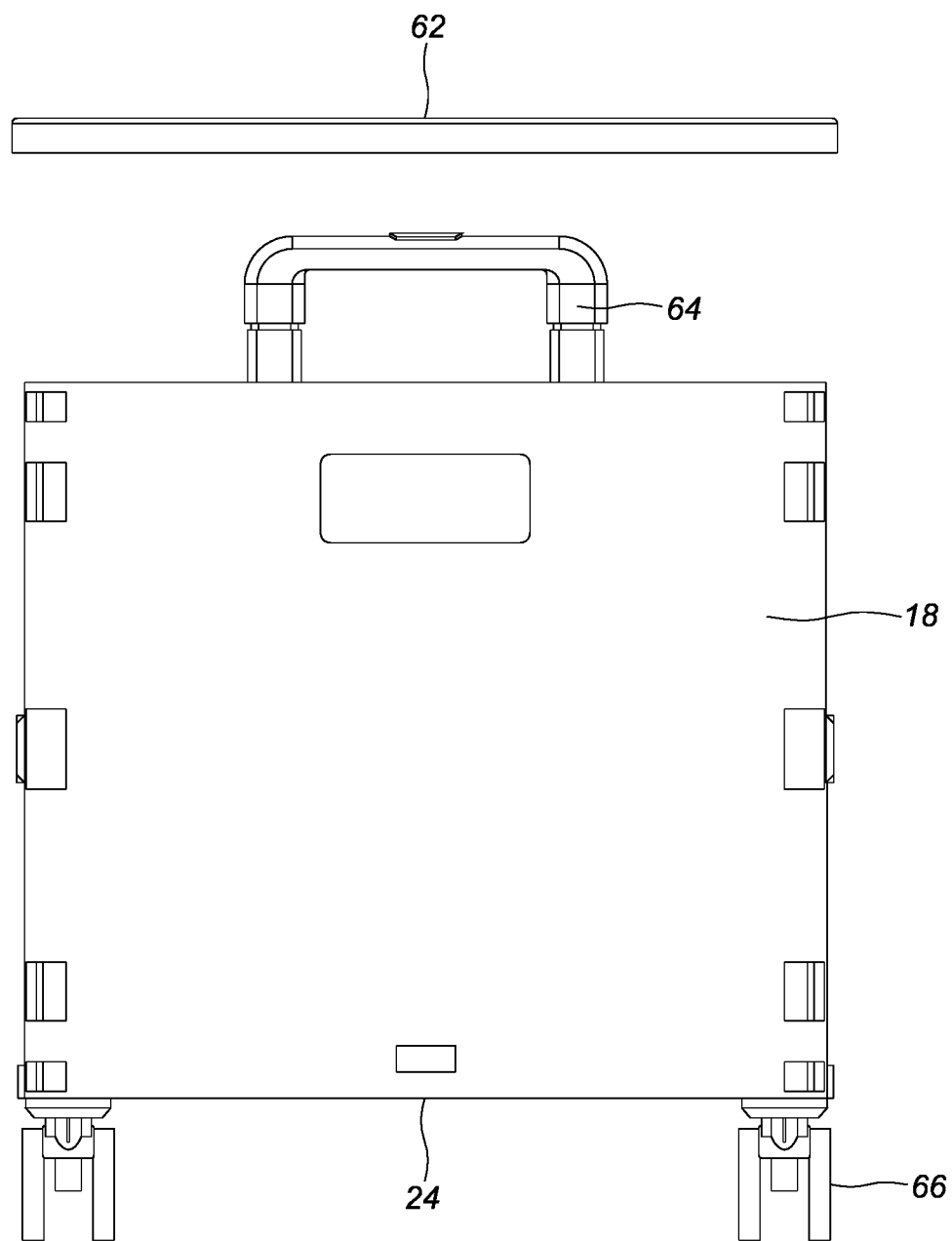
FIG. 5 is rear plan view of the collapsible cart of FIG. 1, according to an embodiment.
Figure 6:
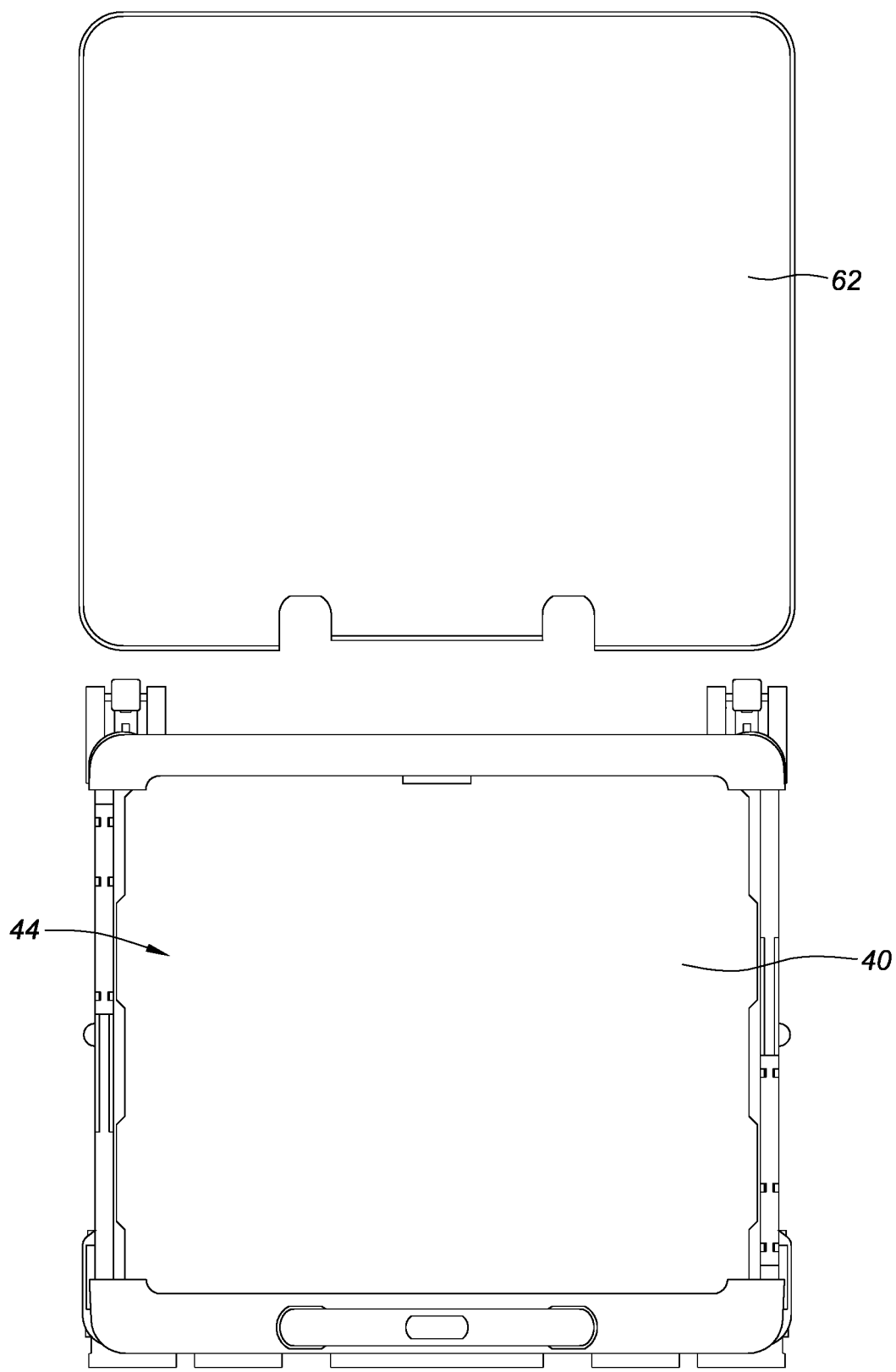
FIG. 6 is top view of the collapsible cart of FIG. 1, according to an embodiment.
Figure 7:
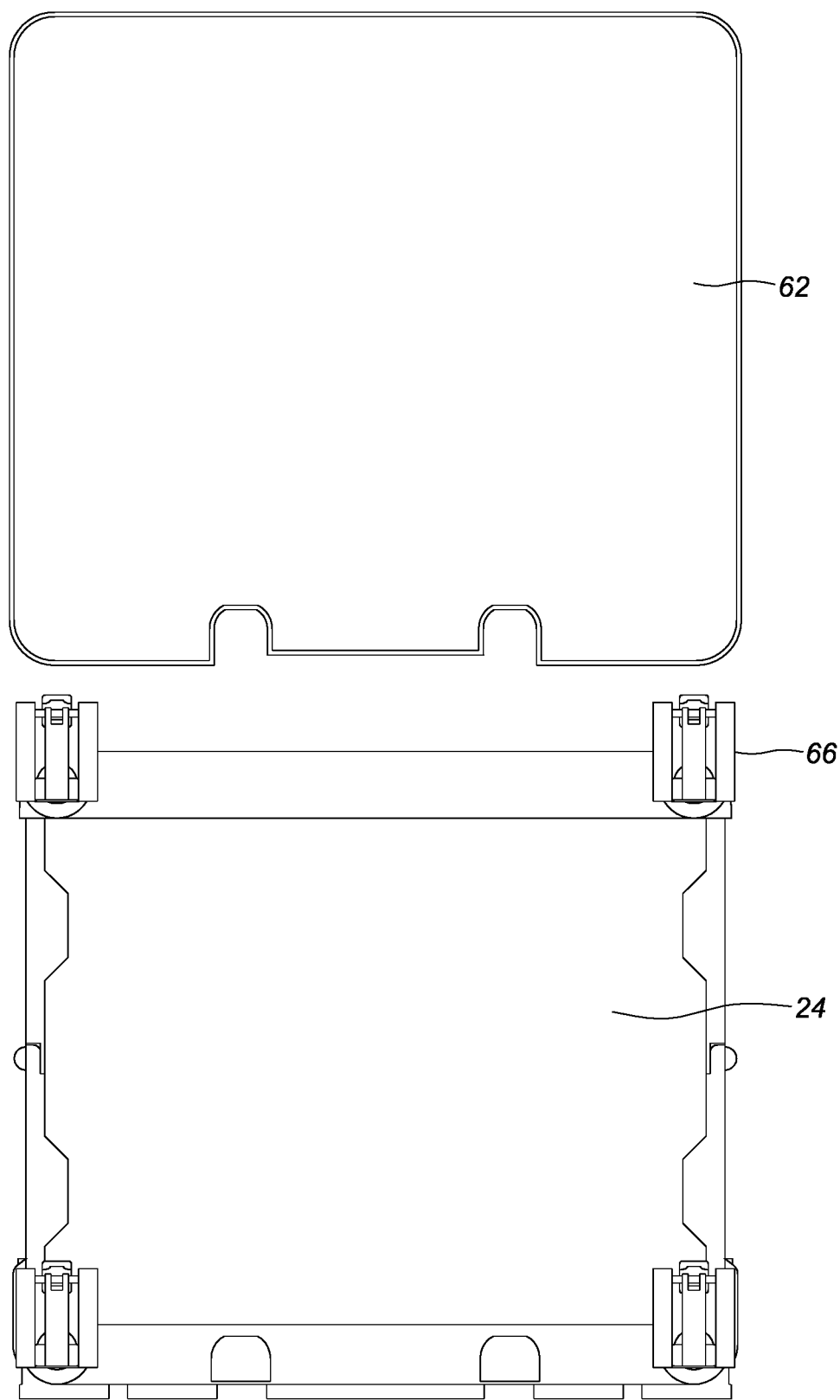
FIG. 7 is bottom view of the collapsible cart of FIG. 1, according to an embodiment.
Figure 8:
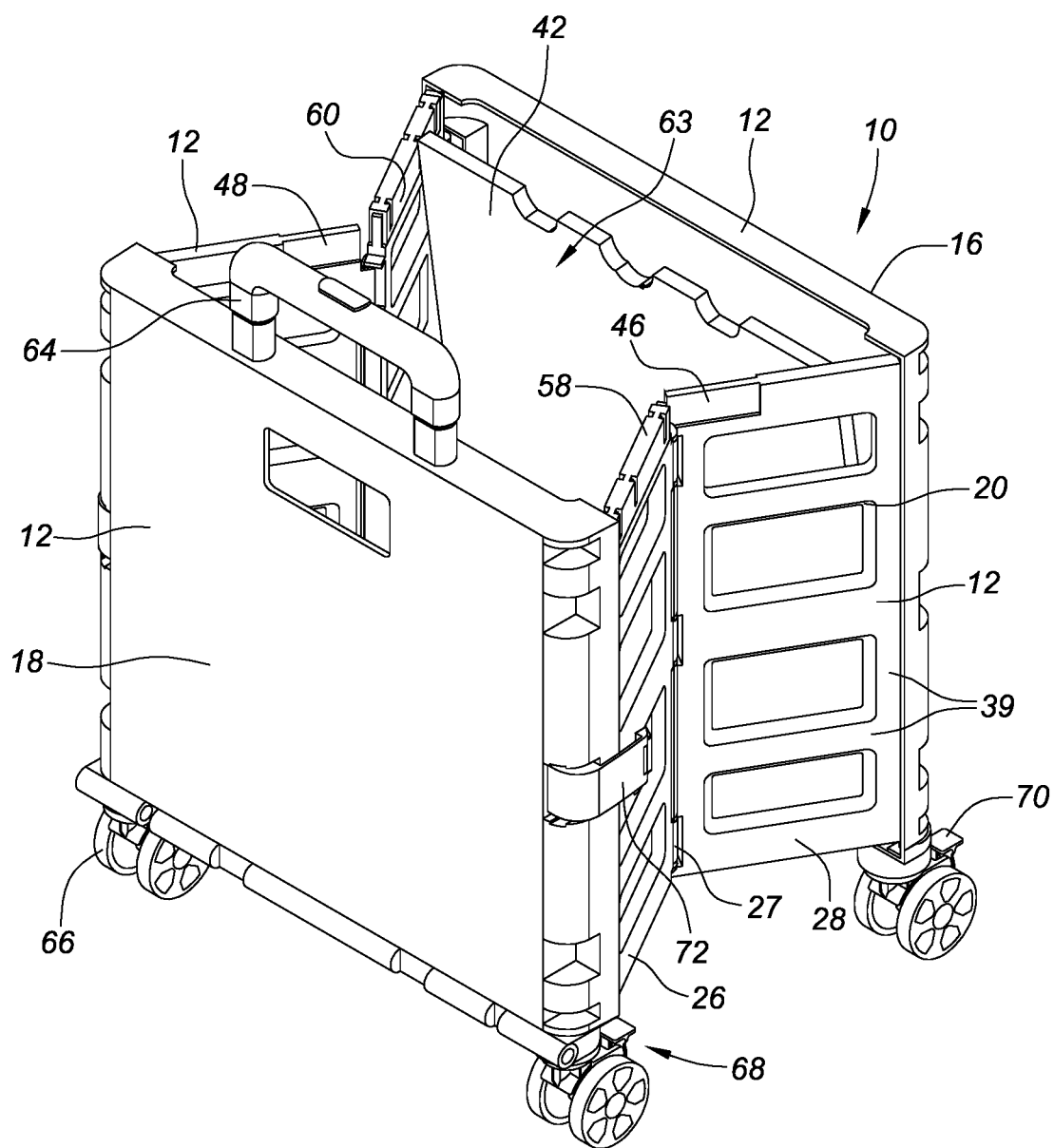
FIG. 8 is a perspective view of the collapsible cart of FIG. 1 illustrated with the sidewalls folded inwardly, according to an embodiment.
Figure 9:
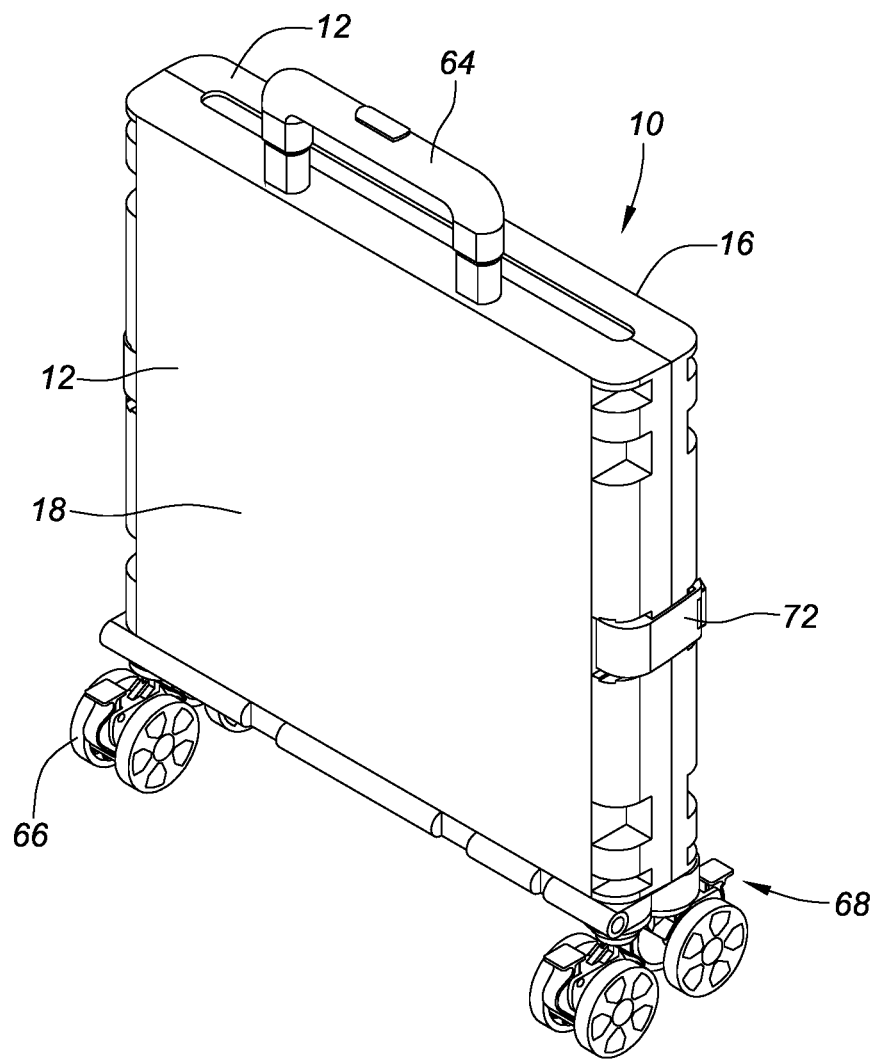
FIG. 9 is a perspective view of the collapsible cart of FIG. 1 illustrated in a closed condition, according to an embodiment.

FIGS. 1-9 illustrate an embodiment of a collapsible cart 10 with swivel wheels, according to an embodiment. The collapsible cart 10 may include a rigid frame 12 forming a compartment 14. The rigid frame may a front wall 16, a rear wall 18, a right sidewall 20, a left sidewall 22, and a bottom wall 24. The right sidewall 20 and the left sidewall 22 are adapted to fold inwardly. The right sidewall 20 may include a first right panel 26 and a second right panel 28. The first right panel 26 may be coupled with a first hinge 27 to the second right panel 28 along a first vertical axis 30. The left sidewall 22 may include a first left panel 32 and a second left panel 34. The first left panel 32 may be coupled with a second hinge 33 to the second left panel 34 along a second vertical axis 36.

As can be appreciated, the first right panel 26, the second right panel 28, the first left panel 32 and the second left panel 34 may be formed of molded rigid plastic. In one embodiment, the first right panel 26, the second right panel 28, the first left panel 32 and the second left panel 34 may each be a solid panel member. In another embodiment, the first right panel 26, the second right panel 28, the first left panel 32 and the second left panel 34 may each be configured in a frame structure with a plurality of apertures 38 positioned between vertical and horizontal rigid members 39. Artisans would appreciate that this configuration allows for light-weight construction of the sidewalls 20 and 22.

In one embodiment, the collapsible cart 10 may include a rotatable base panel 40 (shown in FIGS. 6 and 8) rotatably coupled to the bottom wall 24 within the compartment 14. The rotatable base panel 40 may include a lower surface 42 (shown FIG. 8) and an upper surface 44 (shown FIG. 6). As can be appreciated, when in use, the rotatable base panel 40 may be rotated so that its lower surface rests against an interior surface of the bottom wall 24.

In another embodiment, the collapsible cart 10 may include a first track 46 and a second track 48. The first track 46 may extend across the first vertical axis 30 from a first position 50 on the first right panel 26 to a second position 52 on the second right panel 28. The second track 48 may extend across the second vertical axis 36 from a first position 54 on the first left panel 32 to a second position 56 on the second left panel 34.

The collapsible cart 10 may also include a first slideable member 58 and a second slideable member 60. The first slideable member 58 may cooperatively engage the first track 46 and may be movable between an open position to allow the right sidewall 20 to fold inwardly (shown in FIG. 8), to a closed position to selectively secure or lock the first right panel 26 to the second right panel 28 (shown in FIG. 2). As can be appreciated, the first slideable member 58 is in the open position when adjacent the first position 50 of the first track 46 and is in the closed position when adjacent the second position 52 of the first track 46. Similarly, the second slideable member 60 may be cooperatively engage the second track 48 and may be movable between an open position to allow the left sidewall 22 to fold inwardly (shown in FIG. 8), to a closed position to selectively secure or lock the first left panel 32 to the second left panel 34. As can be appreciated, the second slideable member 60 is in the open position when adjacent the first position 54 of the second track 48 and is in the closed position when adjacent the second position 56 of the second track 48. In another embodiment, the collapsible cart 10 may include one only one slideable member on either one of the sidewalls 20 or 22. Alternatively, the collapsible cart 10 may include a plurality of slideable members for each sidewall 20 and 22.

In one embodiment, the collapsible cart 10 may include a rigid cover panel 62 and a retractable handle 64. The rigid cover panel 62 may be formed of a molded plastic with a ribbed pattern for increased rigidity. The rigid cover panel 62 may be configured to confirm in shape and fit snugly to a top opening 63 of the compartment 14. The rigid cover panel 62 may securely fit in a first position over the top opening 63 to serve as a cover or seat on top of the collapsible cart 10. The rigid cover panel 62 may include one or more protrusions on a bottom surface to removably secure to the front wall 16 of the collapsible cart 10. Meanwhile, the retractable handle 64 may be positioned adjacent the back wall 12.

As shown in FIGS. 1-9, the collapsible cart 10 may include a plurality of rotatable swivel wheels 66 coupled to the bottom wall 24 of the collapsible cart 10. The rotatable swivel wheels 66 may include at least one wheel locking assembly 68 having a first condition for locking at least one of the rotatable swivel wheels to prevent rolling movement, and a second condition for unlocking the at least one of the rotatable swivel wheels. As can be appreciated, the at least one wheel locking assembly may include a brake actuator pedal 70.

Figure 10:
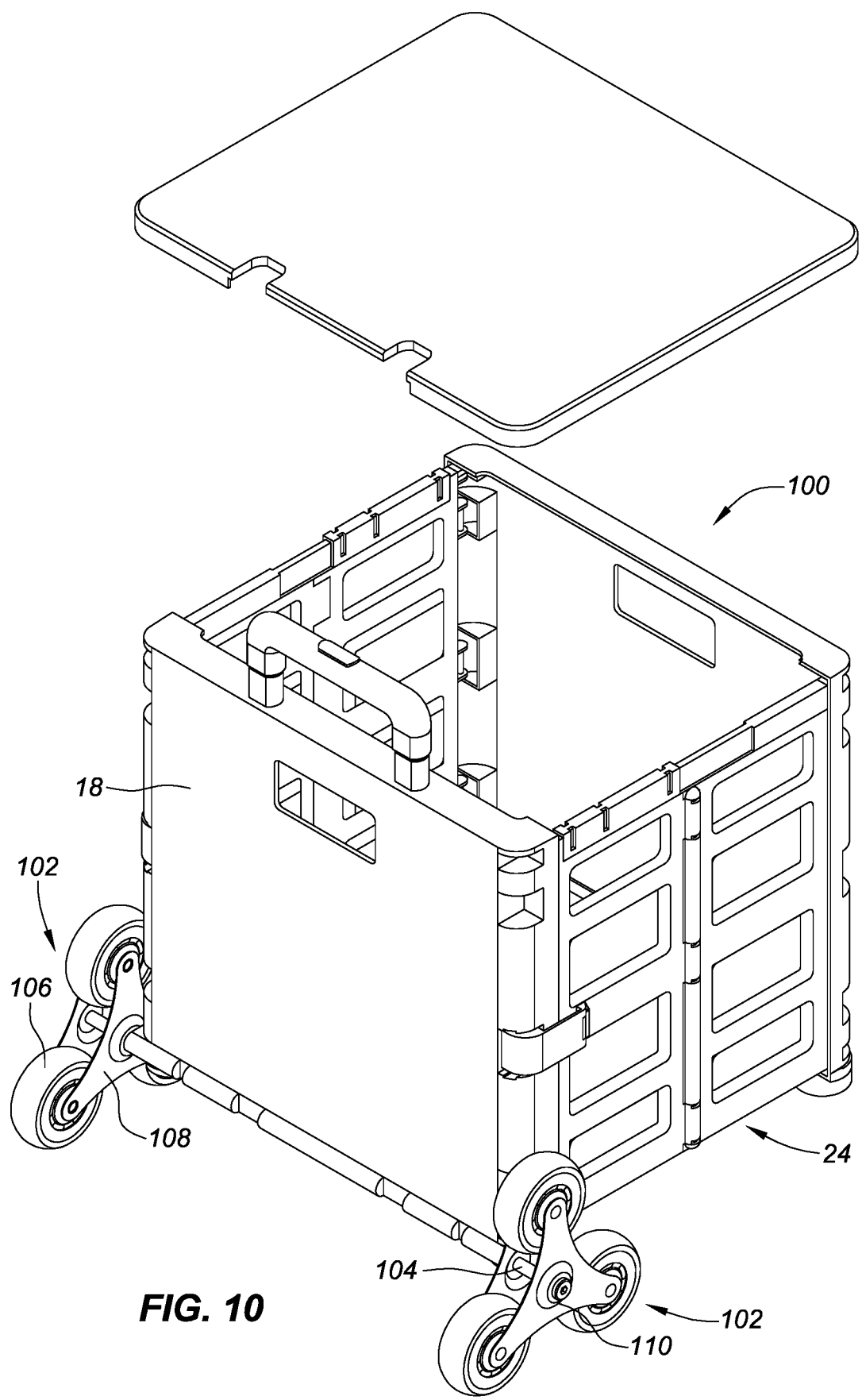
FIG. 10 is a perspective view of a collapsible cart illustrated in an open condition, according to an embodiment.
Figure 11:
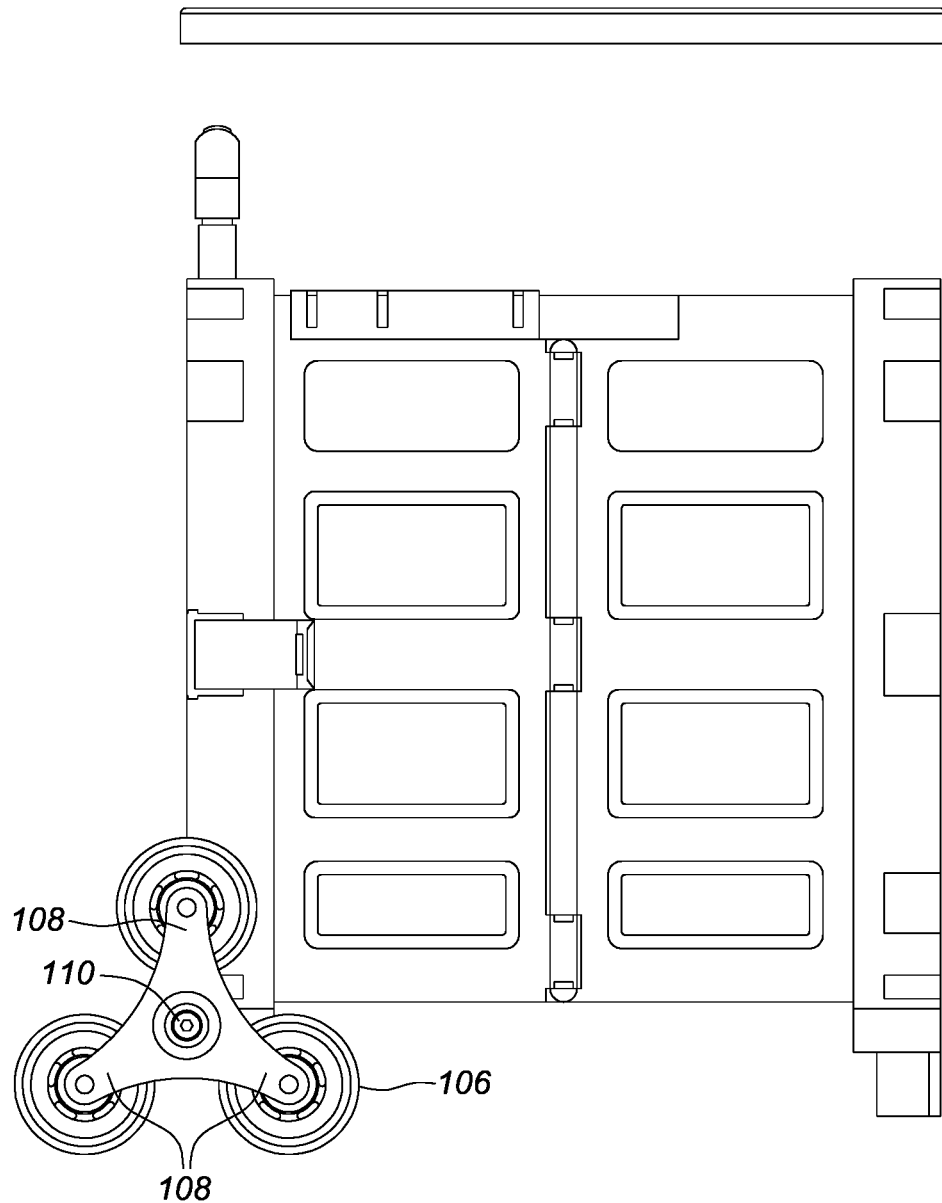
FIG. 11 is right side view of the collapsible cart of FIG. 10, according to an embodiment.
Figure 12:
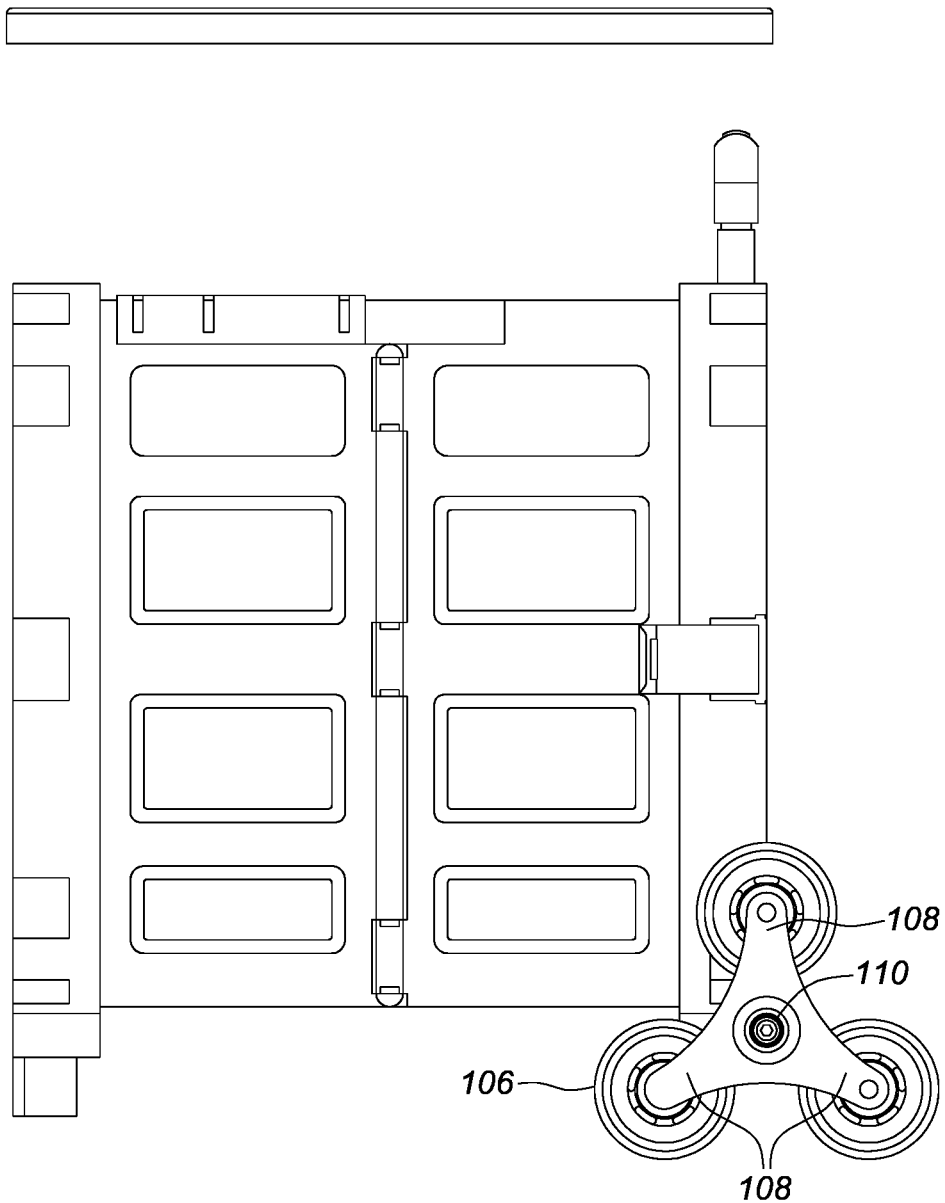
FIG. 12 is left side view of the collapsible cart of FIG. 10, according to an embodiment.
Figure 13:
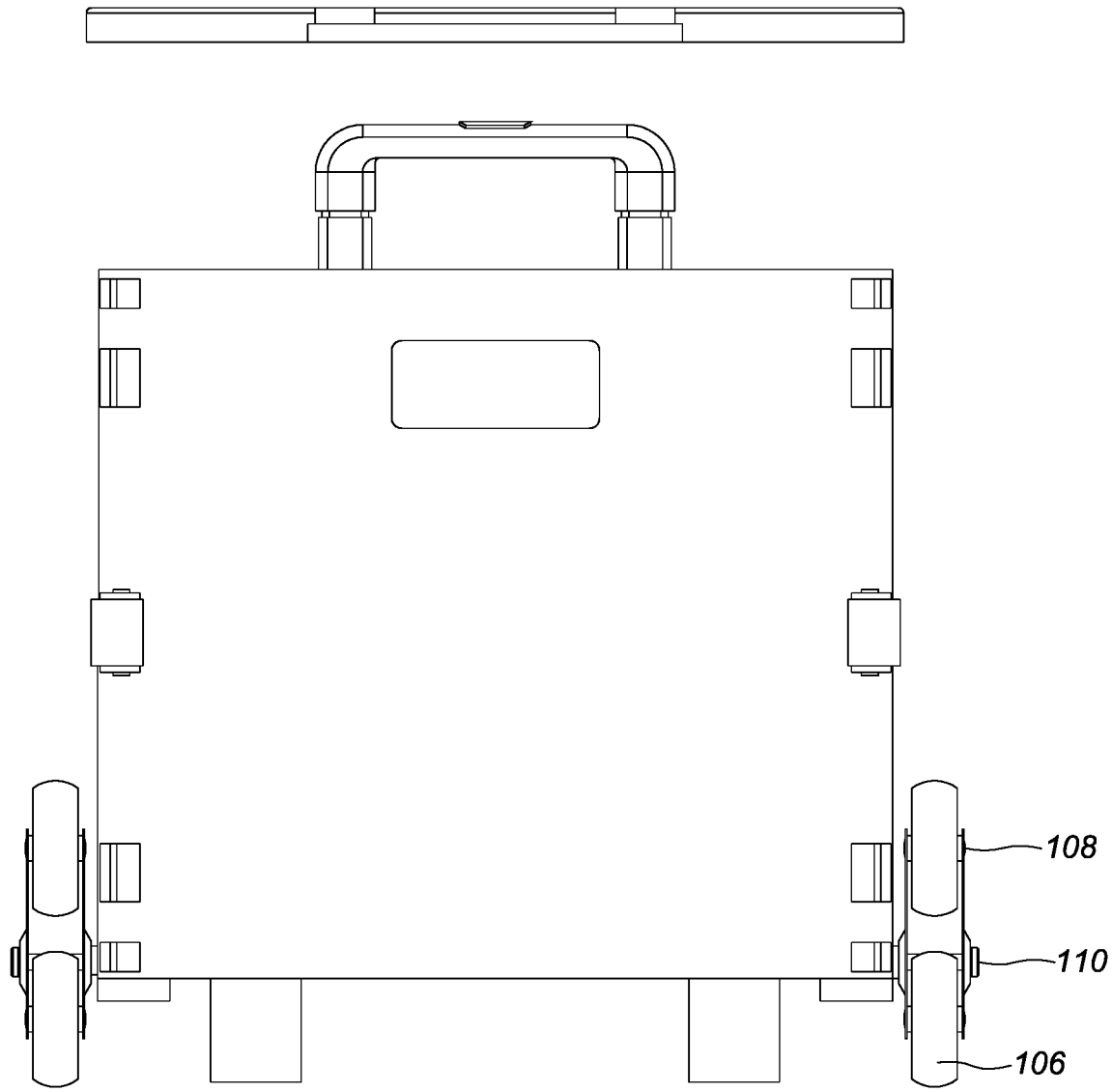
FIG. 13 is front plan view of the collapsible cart of FIG. 10, according to an embodiment.
Figure 14:
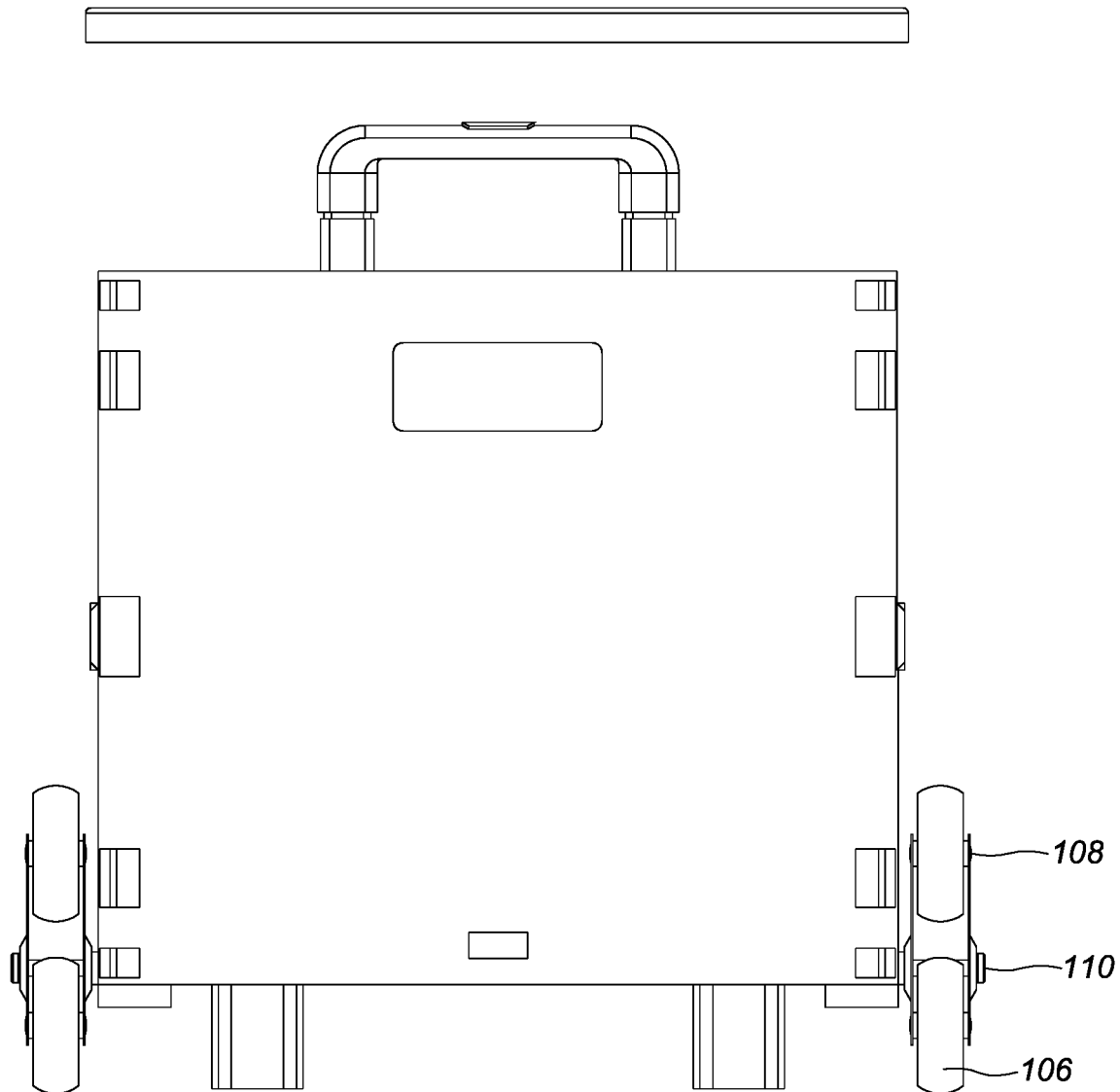
FIG. 14 is rear plan view of the collapsible cart of FIG. 10, according to an embodiment.
Figure 15:
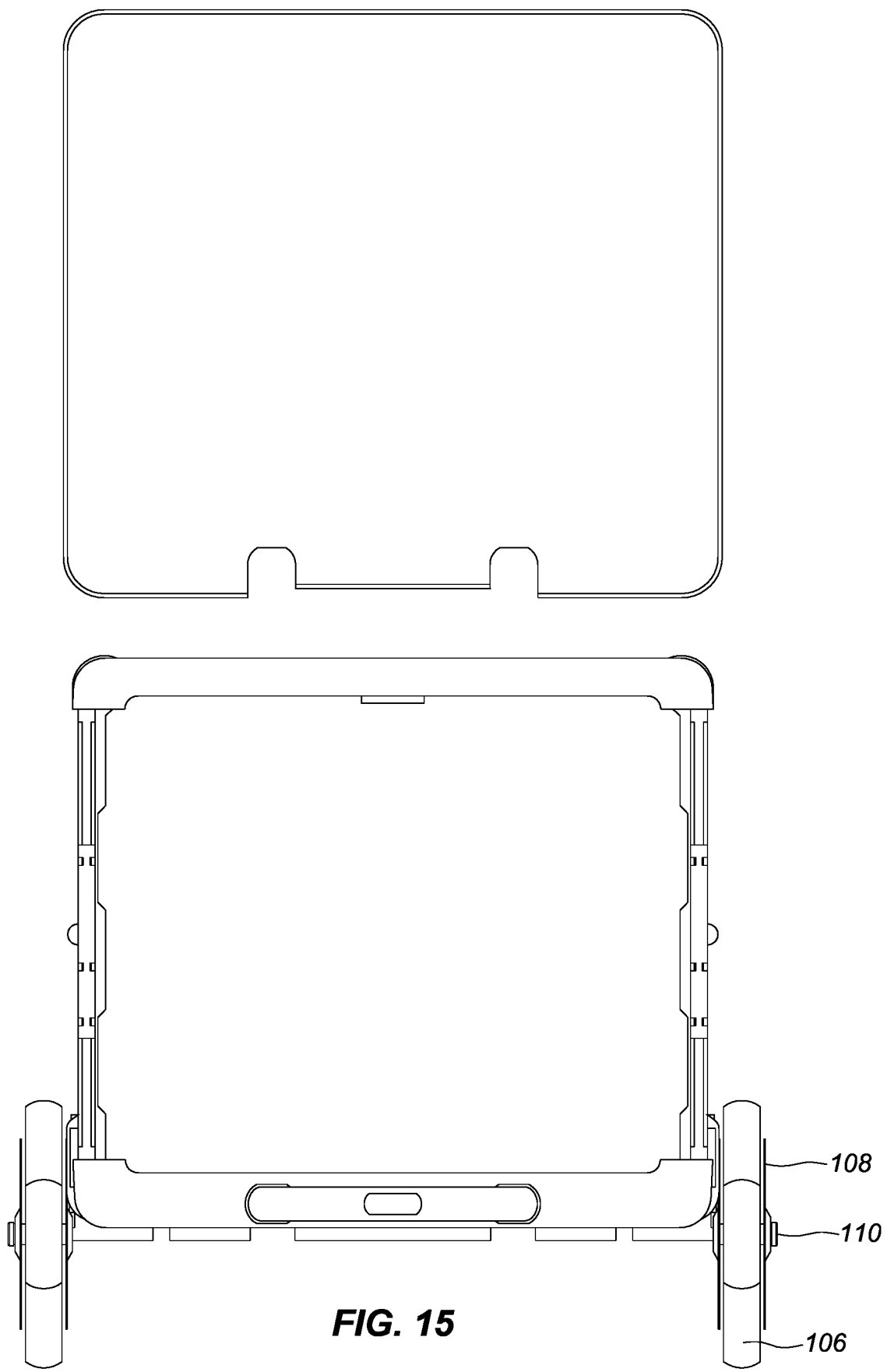
FIG. 15 is top view of the collapsible cart of FIG. 10, according to an embodiment.
Figure 16:
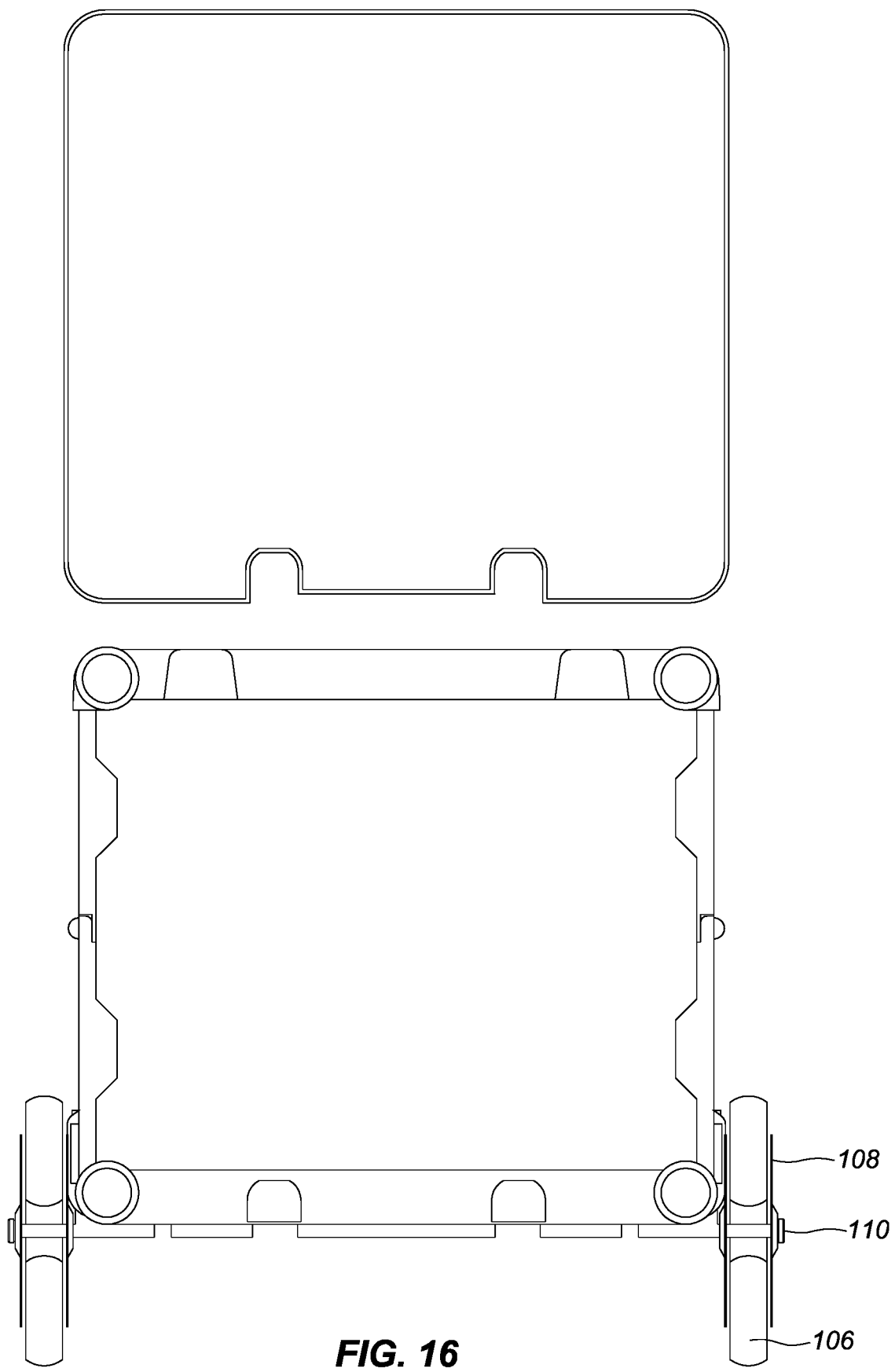
FIG. 16 is bottom view of the collapsible cart of FIG. 10, according to an embodiment.
Figure 17:
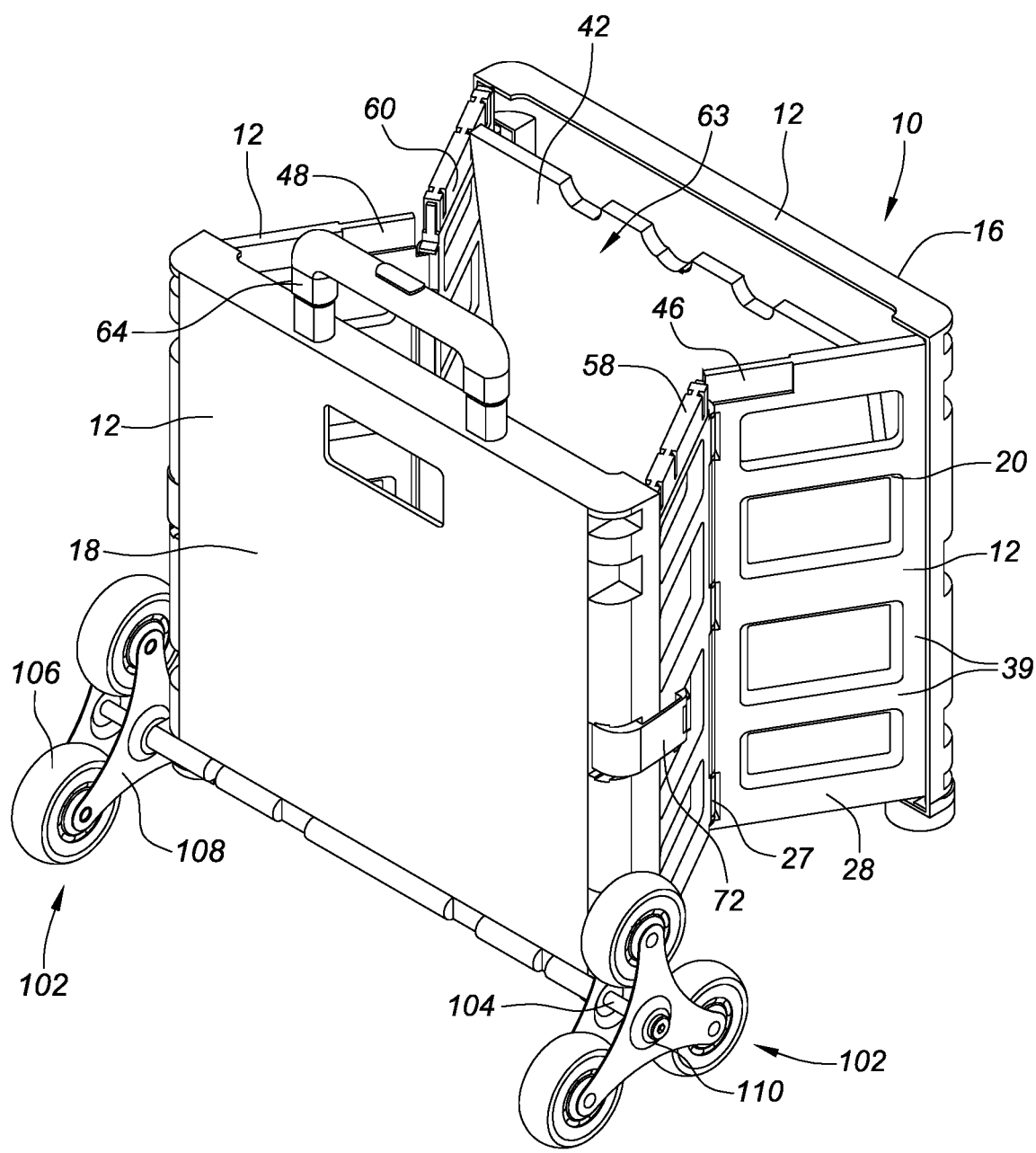
FIG. 17 is a perspective view of the collapsible cart of FIG. 10 illustrated with the sidewalls folded inwardly, according to an embodiment.
Figure 18:
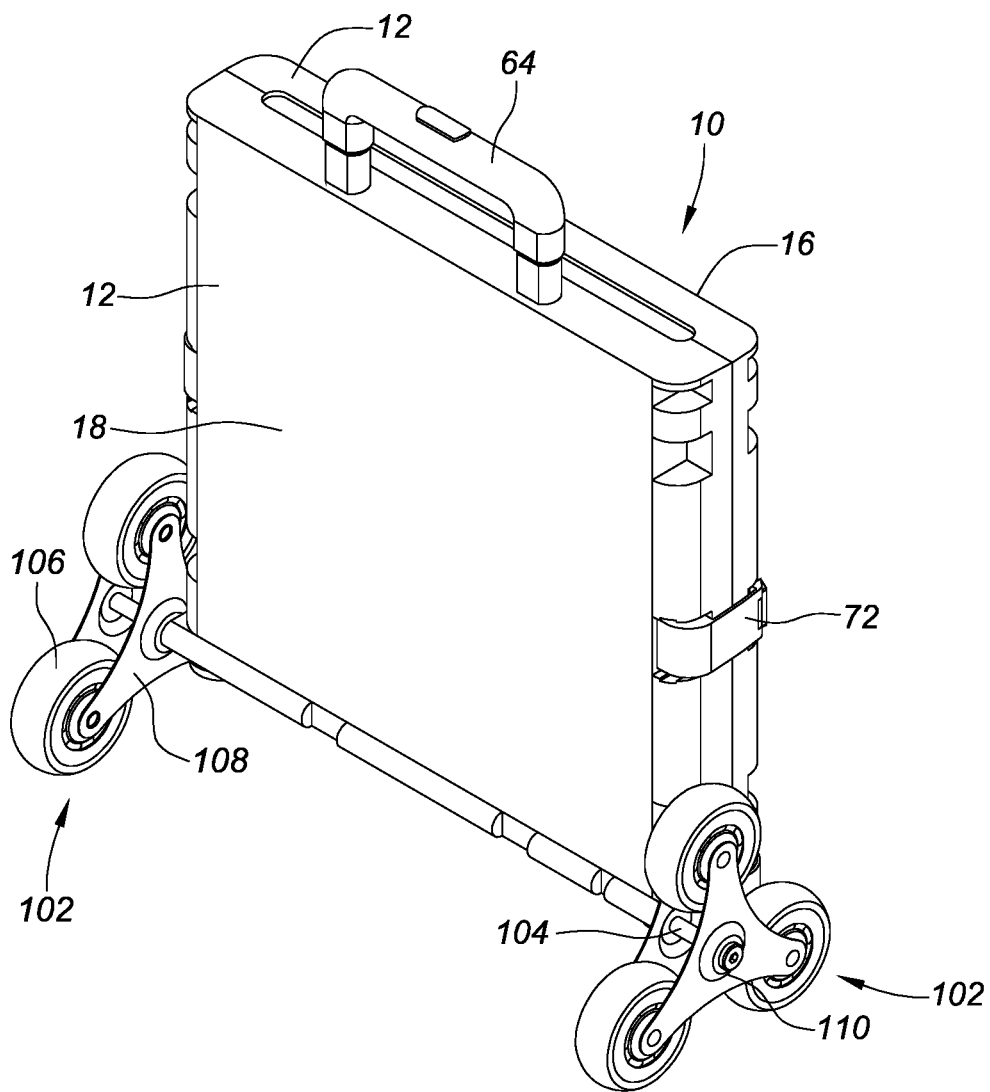
FIG. 18 is a perspective view of the collapsible cart of FIG. 10 illustrated in a closed condition, according to an embodiment.

FIGS. 10-18 illustrate an embodiment of a collapsible cart 100 with a pair of three-wheel assemblies 102, according to an embodiment. The collapsible cart 100 may include a spindle 104 rotatably coupled to the bottom wall 24 and adjacent an intersection of the bottom wall 24 and the rear wall 18. Each three-wheel assembly 102 may include three wheels 106, three spokes 108 and a central rotational point 110. As can be appreciated, each wheel 106 may be rotatably coupled to one of the three spokes 108, and each spoke 108 may be connected to the central rotational point 110 coupled to the spindle 104.

As can be appreciated, the collapsible cart 10 may be fabricated with a light-weight material, such as plastic. In one embodiment, one or more of the walls 16, 18, 20, 22 and 24 may be formed of a molded plastic with a ribbed pattern for increased rigidity.

In operation, the collapsible cart 10 and 100 is transitioned from a closed condition where it is folded up to an open position where it is expanded for use. In the closed condition (shown in FIGS. 9 and 18), a user may unlock clips 72 on the right side and left side to extend the right and left opposing sidewalls 20 and 22. The user may need to insert his or hands in the compartment 14 to push out the sidewalls 20 and 22. As the sidewalls 20 and 22 are pushed outwards, the rotatable base panel 40 drops down such that its lower surface rests against the interior surface of the bottom wall 24, and stabilizes the cart by fitting tightly between the lower region of the two opposing sidewalls 20 and 22. The first slideable member 58 and the second slideable member 60 may then be moved along their respective tracks 46 and 48 and from their respective open position to their respective closed position to selectively secure the sidewall panels. As can be appreciated, the slideable members 58 and 60 may be used to hold the extended sidewalls 20 and 22 in place. The rigid cover panel 62, which may be secured to the front wall 16 for storage, may be unlatched and securely fit over the top opening 63 of the compartment 14 to serve as a cover or seat. The collapsible cart 10 or 100 may be used to transport heavy loads in this open condition or may be collapsed in reverse fashion to place in a closed condition for storage.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this disclosure is not be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

Further, all claim terms should be interpreted in their most expansive forms so as to afford the applicant the broadest coverage legally permissible. Although the embodiments have been described with reference to the drawings and specific examples, it will readily be appreciated by those skilled in the art that many modifications and adaptations of the processes, methods and apparatuses described herein are possible without departure from the spirit and scope of the embodiments as claimed herein. Thus, it is to be clearly understood that this description is made only by way of example and not as a limitation on the scope of the embodiments as claimed below.

What is claimed is:

1. A collapsible cart configured to transition from a closed condition where it is folded up to an open condition where it is expanded for use, the collapsible cart comprising:
   a rigid frame forming a compartment, the rigid frame having a front wall, a rear wall, a right sidewall, a left sidewall, and a bottom wall, the right sidewall and the left sidewall are configured to fold inwardly in the closed condition; the right sidewall comprising a first right panel rotatably coupled to a second right panel;
   a first track formed along the first right panel and the second right panel extending from a first position on the first right panel to a second position on the second right panel; and
   a first slideable member cooperatively engaged to the first track, the first slideable member is movable along the first track between an open position to a closed position to selectively lock the first right panel to the second right panel, wherein the first slideable member is in the open position when disposed along the first track adjacent the first position of the first track while not disposed along the second right panel and is in the closed position when disposed along the first track adjacent the second position of the first track while being disposed across both the first right panel and second right panel.

2. The collapsible cart of claim 1, wherein the left sidewall comprising a first left panel rotatably coupled to a second left panel.

3. The collapsible cart of claim 2, further comprising:
   a second track formed along the first left panel and the second left panel extending from a first position on the first left panel to a second position on the second left panel; and
   a second slideable member cooperatively engaged to the second track, the second slideable member is movable along the second track between an open position to a closed position to selectively lock the first left panel to the second left panel, wherein the second slideable member is in the open position when disposed along the second track adjacent the first position of the second track while not disposed along the second left panel and is in the closed position when disposed along the second track adjacent the second position of the second track while being disposed across both the first left panel and second left panel.

4. The collapsible cart of claim 1, wherein at least one of the front wall, the rear wall, the right sidewall, and the left sidewall includes at least one aperture disposed therethrough.

5. The collapsible cart of claim 1, wherein the front wall, the rear wall, the right sidewall, and the left sidewall are each formed of a molded rigid plastic.

6. The collapsible cart of claim 1, further comprising a rigid cover panel confirming in shape to a top opening of the compartment, the rigid cover panel securely fits in a first position over the top opening to serve as a cover on top of the cart.

7. The collapsible cart of claim 1, further comprising a retractable handle adjacent the back wall.

8. The collapsible cart of claim 1, further comprising a wheel assembly coupled to the bottom wall of the cart.

9. The collapsible cart of claim 8, wherein the wheel assembly includes at least one wheel locking assembly, the at least one wheel locking assembly having a first condition for locking at least one of the wheels of the wheel assembly to prevent a rolling movement, and a second condition for unlocking the at least one of the wheels of the wheel assembly to allow the rolling movement.

10. A collapsible cart configured to transition from a closed condition where it is folded up to an open condition where it is expanded for use, the collapsible cart comprising:
    a rigid frame forming a compartment in the open condition, the rigid frame having a front wall, a rear wall, a right sidewall, a left sidewall, and a bottom wall,
    wherein the right sidewall and the left sidewall are configured to fold inwardly in the closed condition,
    wherein the right sidewall comprises a first right panel rotatably coupled to a second right panel,
    wherein the first right panel comprises a first locking member in the open condition and the closed condition, and the second right panel comprises a second locking member in the open condition and the closed condition, and
    wherein the first locking member cooperatively engages the second locking member to selectively align the first right panel with the second right panel.

11. The collapsible cart of claim 10, wherein the left sidewall comprises a first left panel rotatably coupled to a second left panel, the first left panel having a third locking member and the second left panel having a fourth locking member.

12. The collapsible cart of claim 10, wherein at least one of the front wall, the rear wall, the right sidewall, and the left sidewall includes at least one aperture disposed therethrough.

13. The collapsible cart of claim 10, further comprising a plurality of rotatable swivel wheels coupled to the bottom wall of the collapsible cart having at least one wheel locking assembly, the at least one wheel locking assembly having a first condition for locking at least one of the rotatable swivel wheels to prevent rolling movement, and a second condition for unlocking the at least one of the rotatable swivel wheels.

14. The collapsible cart of claim 10, further comprising a rigid cover panel confirming in shape to a top opening of the compartment, the rigid cover panel securely fits in a first position over the top opening to serve as a cover or seat on top of the collapsible cart.

15. The collapsible cart of claim 10, further comprising a retractable handle adjacent the back wall.

16. A collapsible cart configured to transition from a closed condition where it is folded up to an open condition where it is expanded for use, the collapsible cart comprising:
    a rigid frame forming a compartment in the open condition, the rigid frame having a front wall, a rear wall, a right sidewall, a left sidewall, and a bottom wall, the right sidewall and the left sidewall are configured to fold inwardly in the closed condition, the right sidewall comprising a first right panel rotatably coupled to a second right panel;
    a first lock assembly integrated with the first right panel and the second right panel and configured to selectively lock the first right panel with the second right panel in the open condition, the first lock assembly having a first condition for locking the first right panel with the second right panel in the open condition, and a second condition for unlocking the first right panel from the second right panel, and wherein the first lock assembly is integrated with the first right panel and the second right panel in both the closed condition and in the open condition.

17. The collapsible cart of claim 16, wherein the left sidewall comprises a first left panel rotatably coupled to a second left panel.

18. The collapsible cart of claim 17, further comprising a second lock assembly integrated with the first left panel and the second left panel, the second lock assembly having a first condition for locking the first left panel with the second left panel in the open condition, and a second condition for unlocking the first left panel from the second left panel.

19. The collapsible cart of claim 16, wherein at least one of the front wall, the rear wall, the right sidewall, and the left sidewall includes at least one aperture disposed therethrough.

20. The collapsible cart of claim 16, further comprising a retractable handle extending from the back wall.

21. The collapsible cart of claim 16, wherein the first right panel and the second right panel are aligned in a first plane in the first condition.

22. A collapsible cart configured to transition from a closed condition where it is folded up to an open condition where it is expanded for use, the collapsible cart comprising:
a frame defining a compartment, wherein:
the frame comprises at least five walls, including a first wall, a second wall, a third wall, a fourth wall, and a fifth wall;
at least three of the walls are configured to fold inwardly toward the fifth wall when the cart is in the closed condition;
the third wall comprises a first panel and a second panel, the second panel rotatably coupled to the first panel;
a first fastener configured to selectively secure the first panel and the second panel in the open condition, the first fastener operable between a first state for securing the first panel and the second panel along a first plane in the open condition, and a second state for releasing the first panel and the second panel from the first plane; and
wherein the first fastener is integrated with the first right panel and the second right panel in both the closed condition and in the open condition.

23. The collapsible cart of claim 22, wherein the fourth wall comprises a third panel rotatably coupled to a fourth panel.

24. The collapsible cart of claim 23, further comprising a second fastener integrated with the fourth wall, the second fastener operable between a first state for securing the third panel and the fourth panel along a second plane in the open condition, and a second state for releasing the third panel and the fourth panel from the second plane.

25. The collapsible cart of claim 24, wherein at least one of the first, second, third, and fourth walls includes at least one aperture disposed therethrough.

26. The collapsible cart of claim 22, wherein at least one of the first, second, third, and fourth walls includes at least one aperture disposed therethrough.

27. The collapsible cart of claim 22, wherein the first fastener comprises a slidable member and a track.

* * * * *